United States Patent
James et al.

[15] 3,689,540
[45] Sept. 5, 1972

[54] PHLORETIC ACID DERIVATIVES

[72] Inventors: John W. James, Langley; Robert Stevens, Slough, both of England

[73] Assignee: Aspro-Nicholas Limited, London, England

[22] Filed: June 11, 1969

[21] Appl. No.: 832,433

[30] Foreign Application Priority Data

June 21, 1968    Great Britain...........29,719/68

[52] U.S. Cl....................260/521 R, 260/54, 260/55, 260/348 A, 260/405.5, 260/406, 260/410.6, 260/410.7, 260/410.9, 260/465 F, 260/473 S, 260/842
[51] Int. Cl...........................................C07c 65/04
[58] Field of Search..................................260/521 R

[56] References Cited

UNITED STATES PATENTS 3,496,211    2/1970    Dexter et al...............260/521

*Primary Examiner*—Lorraine A. Weinberger
*Assistant Examiner*—John F. Terapane
*Attorney*—William Anthony Drucker

[57] ABSTRACT

Novel 5-hydroxymethyl and 3,5-dihydroxymethyl phloretic acid derivatives are described together with a process for their preparation from the corresponded unsubstituted phloretic acid derivative, useful as polymerizable monomers. Esters with monohydric and polyhydric alcohols, mixed esters with other acids and alcohols, and polymerization products of the phloretic acids and esters are provided.

9 Claims, No Drawings

PHLORETIC ACID DERIVATIVES

This invention relates to phloretic acid derivatives, polymeric products formed therefrom and to methods for the preparation thereof.

The phloretic acid derivatives of the present invention have the formula:

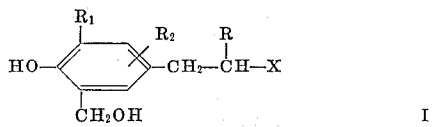

wherein X is CN or COOH, R and $R_2$, which may be the same or different, represent hydrogen or lower alkyl, $R_1$ represents hydrogen, lower alkyl or hydroxymethyl, and alkali metal salts, and esters thereof.

The term "lower alkyl" is used herein to mean saturated and unsaturated, straight and branched-chain alkyl groups having from one to six carbons and preferably one to four carbons. Exemplary of suitable lower alkyl groups are methyl, ethyl, propyl, butyl, amyl, hexyl, ethenyl, ethynyl, prop-1-enyl, prop-2-enyl (i.e. allyl), prop-1-ynyl, prop-2-ynyl, but-1-enyl, but-1-ynyl, but-2-enyl, but-2-ynyl, but-3-enyl, pent-1-enyl, pent-2-enyl, pent-2ynyl, pent-4-ynyl, 2-methylbut-1-enyl, 3-methylbut-1-ynyl, 2-methylbut-2-enyl, 1,1-dimethylprop-2-enyl, hex-1-ynyl, hex-3-enyl, hex-3-ynyl, hex-4-ynyl, hex-5-ynyl, 3,3-dimethylbut-1-enyl, 3-ethylbut-1-ynyl, 2,3-dimethylbut-2-enyl, 3-methyl-3-ethyl prop-1-ynyl, 1-methyl-1-ethylprop-2-enyl, pent-1,3-dienyl, hexa-1,3-dien-5-ynyl, pent-1-en-4-ynyl, pent-2-en-4-ynyl, 2,3-dimethylbuta-1,3-dienyl and the like.

Where throughout this specification reference is made to a substituent without reference to its isomeric state, that reference includes a reference to all the isomers of that substituent, for example, reference to butyl includes n-butyl, i-butyl, s-butyl and t-butyl.

The compounds of formula I may be made by the conventional hydroxymethylation of a phloretic acid compound of the formula:

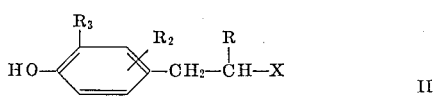

wherein R, $R_2$ and X are as defined in formula I, $R_3$ is hydrogen or lower alkyl, or an alkali metal salt or ester thereof. Certain of these esters are novel compositions of matter and form a part of this invention. Such esters are those formed by reaction with polyhydric alcohols, and long-chain monohydric alcohols containing at least 10 carbon atoms as well as mixed esters as hereinafter described.

Hydroxymethylation is conveniently carried out by condensing the compound of formula II with a monomeric or polymeric formaldehyde in a basic medium, for example in the presence of an alkali metal hydroxide such as sodium or potassium hydroxide. Advantageously the hydroxymethylation is carried out at elevated temperatures, for example between 30° and 70° C. By varying the quantities of reactants and by modifying the reaction conditions used, either the 5-hydroxymethyl compound or 3,5-dihydroxymethyl compound of formula I, or a mixture thereof, is obtained.

An alkali metal salt produced by such a reaction may be converted to the free acid, ester or nitrile, by reaction with a suitable acid such as hydrochloric or sulphuric acid.

Conversely the free acid, ester or nitrile may be converted into a salt by known methods such as reacting the compound, preferably a solution thereof, with an appropriate base such as an alkali metal hydroxide, carbonate or hydrogen carbonate. The esters of the acids of formula I may be prepared by reaction of the corresponding ester of the acid of formula II with the hydroxy-methylating agent or a subsequent reaction with the acid of formula I. In either case, the reaction may be carried out without the prior isolation of the ester of the acid of formula II or the acid of formula I. The esterification agent is preferably a monohydric or polyhydric alcohol. The monohydric alcohols comprise particularly long-chain alcohols containing from 10 to 36 carbon atoms. Such alcohols include the reduction products of naturally occurring unsaturated oils such as China wood oil, dehydrated castor oil, linseed oil, soya bean oil, corn oil, cottonseed oil and fish oils. These alcohols are usually prepared by selective reduction of the corresponding oil or the simpler esters of the oil acids. Preferably the long-chain alcohols have from 16 to 22 carbon atoms. It will be apparent that the novel esters with such monohydric alcohols have within the same molecule a residue of the plasticizing or air-drying type and a group which is very reactive with such reagents as aldehydes and epoxides to form readily polymerizable compositions. In the case of the esters of the acids of formula I, the presence of the hydroxymethyl group and the reaction conditions normally employed for esterification cause the immediate polmerisation of the ester.

The polyhydric alcohols used in the preparation of the esters of this invention may be of the non-resinous type or of the resinous type. Examples of the former include simple glycols such as ethylene glycol, propylene glycol, and 2,5-pentane-diol; polyhydroxy ether such as the polymeric polyhydric alcohols, for example polyethylene and polypropylene glycol; and other polyhydric alcohols such as glycerol, erythritol, pentaerythritol, polypentaerythritols, sorbitol, and mannitol as well as polyalkanol amines such as diethanolamine and triethanolamine. Resinous polyhydric alcohols include the reaction products of di- and tri-hydric phenols with chlorohydrins as well as those prepared by the reaction of phenol-formaldehyde condensates with chlorohydrins. The former type of resinous alcohol may be prepared as described inter alia in U. S. Pat. Nos. 2,345,308 and 2,668,807. The latter type of resinous material may be prepared by condensation of, for example, an alkyl phenol with formaldehyde, followed by treatment of an alkaline solution of the intermediate hydroxy-methylated compound with a chlorohydrin such as glycerol monochlorohydrin.

Also included within the esters of the present invention are the mixed esters prepared from one or more acids, an alcohol and the acid of formula I or II. These acids are particularly the long-chain mono-carboxylic acids having 10 to 36 carbon atoms. Advantageously such acids are the drying oil fatty acids having 16 to 22 carbon atoms such as acids obtained by the saponification of linseed oil, soyabean oil, fish oils, tall oil, Chinawood oil and cottonseed oil. Suitable acids may be produced by other methods, for example mixed linoleic acids may be obtained by saponifying dehydrated castor oil. Oleic acid may be used to prepare a linoleic acid by hydroxylation to dihydroxystearic acid, followed by dehydration of the latter. The alcohol used may be a polyhydric alcohol of the type described above or a low molecular weight monohydric alcohol such as methanol, ethanol or butanol. The alcohol may be fully esterified by the long-chain acid and, in this situation, the acid must have or be capable of modification to have at least one hydroxyl or epoxide group to esterify the carboxyl group of the acid of formula I or formula II. Exemplary of fully esterified alcohols are those naturally occurring vegetable and fish oils containing hydroxyl groups or olefin linkages capable of epoxidation. Castor oil, a triglyceride containing hydroxy-lated ester chains, may be used as such, or it may be hydrogenated to give a triglyceride of 12-hydroxystearic acid. Oiticica oil, essentially a triglyceride of licanic acid, may also be used after hydrogenation to yield a triglyceride of 4-hydroxystearic acid. Unsaturated vegetable and fish oils may be oxidized by air, for example using the commercial "-blowing" process, to give suitable products having an esterifiable hydroxyl group. Alternatively the epoxidised unsaturated oil acid esters, such as the epoxidised vegetable oils, for example corn oil, cottonseed oil and soyabean oil, may be used. The amount of acids employed to prepare mixed esters depends upon the particular reactants used. It will be obvious that, to prepare a mixed ester, the maximum number of mols of acid reacted can be no greater than the number of hydroxyl or epoxide groups available for esterification. Within this limit, however, the ratio of unsaturated acid to the acid of formula I or II may be widely varied.

The resultant mixed esters have in the same molecule fatty acid residues and groups which are very reactive with aldehydes and epoxides to form readily polymerizable compositions. Such compositions, as with those formed from the unsaturated monohydric alcohols as described above, are particularly useful products in that the resinous and plasticizing materials are chemically united so that there can be no physical separation of these components during processing.

The compounds of formula I are also useful in that they produce resins by self-polmerisation, by reaction with phenols or phenols and formaldehyde. Self-polmerisation may be accomplished by the application of heat to, or by treatment under acidic conditions of, the compound of formula I or by carrying out the hydroxymethylation of the compound of formula II at elevated temperatures, for example above about 70° C. optionally in the presence of an acid or alkaline catalyst. The reaction of the compounds of formula I with phenols is advantageously carried out without the prior isolation of the compound of formula I from the hydroxymethylation medium. The phenols used include mononuclear, polynuclear, monohydric or polyhydric phenols such as phenol, the cresols, xylenols, alkylphenols, naphthols and bis-(4-hydroxyphenyl) isopropylidene. These phenols first may be partially condensed with formaldehyde and then admixed with a partially condensed mixture of the compound of formula II and formaldehyde to yield after further condensation valuable complex products. Alternatively, the phenols may be admixed, prior to any condensation, with a compound of formula II and formaldehyde to yield after condensation other valuable products. Useful products may also be obtained by condensation of the phenols with the compound of formula I with or without the presence of formaldehyde.

In the acidic phenolic condensates of the present invention, there are present an appreciable number of active hydrogens, i.e. those attached to an oxygen of a hydroxyl or carboxyl group. These condensates will therefore react with other materials, for example materials containing epoxide groups such as polyepoxide resins, to form more highly polymerized products useful in protective coating and moulding compositions. Similarly the acids of formula I or the polyacids prepared as above may be used to modify other polymeric materials such as polyamides, polyimides and polycarbonates. Normally the acids will be incorporated as part of the reaction mix used for the manufacture of such polymers. The acids act to modify the chain length of the resultant polymer as well as providing a cross-linking ability through the hydroxymethyl groups. The acid of formula I or the aforementioned polyacids may of course be prepared in situ in the reaction mix. The nitriles of formula I and the polynitriles produced by self-polymerization or condensation with phenols possess active hydrogens which will react with other materials, for example polyepoxide resins, whilst the nitrile function is of use in modifying polyimide materials by altering the chain length as well as providing a cross-linking ability through the hydroxymethyl groups. In all of the foregoing reactions of the nitriles of formula I, the latter need not be isolated but may be produced in situ by reaction of the corresponding nitrile of formula II with formaldehyde.

The following Examples will further illustrate the invention:

EXAMPLE 1

250g. of phloretic acid [β-(4-hydroxyphenyl)propionic acid] were added to a mixture of formaldehyde (550 ml. of a 35–40percent solution and water (600ml). Sodium hydroxide solution was added slowly to dissolve the acid and the pH was then raised to 10.0 by adding an excess of the sodium hydroxide. The solution was heated for 12 hours at 50° C. before it was poured into 1.25 liters of acetone contained in a separating flask. After shaking well, the bottom layer was run off, dissolved in a small quantity of methanol and on addition of this solution to about 1.5 liters of acetone, a pale yellow solid precipitated. This was filtered off, washed with acetone and dried under vacuum at 60° C. The resultant sodium salt was dissolved in water, sulphuric acid added until the pH was about 3.0 and, after cooling for several hours, a white solid precipitated. This was washed with water and then dried at 60° C. under vacuum to yield 160 g. of β-(3,5-di-hydroxymethyl-4-hydroxyphenyl)propionic acid, m.p. 130°–133° C.

EXAMPLE 2

The method of Example 1 was repeated except that β-(3-methyl-4-hydroxyphenyl)propionic acid was used in place of the phloretic acid. The sodium salt obtained was dissolved in methanol, hydrogen chloride gas passed through the solution to neutralize it and the resultant precipitate of sodium chloride was filtered off. Evaporation of the remaining methanol solution yielded β-(3-methyl-4-hydroxy-5-hydroxymethylphenyl)propionic acid as a pale yellow liquid, $n^{24}$ 1.5367.

EXAMPLE 3

The method of Example 1 was repeated using α-methylphloretic acid in place of the phloretic acid. The resultant sodium salt was treated as in Example 2 and evaporation of the remaining methanol solution yielded α-methyl-β-(3,5-dihydroxymethyl-4-hydroxyphenyl) propionic acid as a light brown liquid, $n^{24}$ 1.5355.

EXAMPLE 4

Phloretic acid (16.6 g.) dissolved in toluene (100 mls) was added to glycerol (40 g.) and concentrated sulphuric acid (0.25 ml.) and the mixture heated under reflux for 8 hours. The mixture was poured into water and three layers separated. The top two layers were decanted off leaving a viscous ester layer to which was added formalin (34 ml.) and a trace of concentrated sulphuric acid. The mixture was heated on a mantle and after refluxing for several hours a white resinous material was deposited. The aqueous layer was decanted off and the last traces of water removed in a rotary evaporator leaving 10 g. of a light brown resinous material, which was soluble in sodium hydroxide solution, slightly soluble in methyl pyrrolidone but insoluble in alcohol, ethyl acetate, petroleum ether and dimethylformamide.

EXAMPLE 5

Phenol (0.94 g.) was mixed with β-(3,5-dihydroxymethyl-4-hydroxy phenyl) propionic acid and the mixture heated to 160° C. A mobile solution was first formed which gradually became more viscous. After 1 hour, a semi-solid was obtained which on cooling yielded a solid, brown resinous material. This resin had no defined melting point but began to char above 260° C. It was slightly soluble in sodium hydroxide.

EXAMPLE 6

β-(3,5-Dihydroxymethyl-4-hydroxyphenyl)propionic acid (10 g.) was heated at 160°–200° C. for 30 minutes. The solid melted, giving off a gas, and finally solidified to a brown resinous material. This resin had no defined melting point but began to char above 300° C. It was slightly soluble in sodium hydroxide.

EXAMPLE 7

β-(p-Hydroxyphenyl)propionitrile (7.2 g.) was added to water (20 ml.) and 40 percent aqueous formaldehyde solution (18 ml.) Sodium hydroxide solution was added until the pH of the solution was 10.4. The mixture was heated at 50° C. for 13 hours, acidified with dilute hydrochloric acid and the precipitated oil was ether extracted. The ether layer was dried over magnesium sulphate, filtered and the ether stripped off to yield 5.2 g. of a pale yellow viscous liquid. Analysis of this mixture showed it to be a mixture of β-(5-hydroxymethyl-and 3,5-dihydroxymethyl-4-hydroxyphenyl) propionitriles, the mono-hydroxymethyl compound predominating.

EXAMPLE 8

Phloretic acid (16.6 g.) and cetyl alcohol (24.2 g.) were dissolved in benzene (150 ml.) contained concentrated sulphuric acid (1 ml.) and the mixture heated under reflux until the theoretical amount of water had been distilled off. The benzene was then distilled off to yield a dark red liquid which solidified on standing. The residue was extracted into ether, the solution shaken with sodium bicarbonate solution until effervescence ceased, the ether layer dried over magnesium sulphate and then charcoaled for a few minutes, filtered and the ether stripped off leaving cetyl β-(4-hydroxyphenyl) propionate, m.p. 56° C.

EXAMPLE 9

By the method of Example 8 but using technical grade oleyl alcohol, there was obtained as a liquid oleyl β-(4-hydroxyphenyl)propionate, b.p.> 240° C./0.01 mm, Hg.

Having regard to the foregoing disclosure, the following is claimed as the inventive and patentable embodiments thereof:

We claim:

1. A Phloretic acid derivative of the formula:

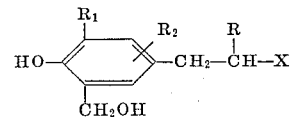

wherein X is COOH, R and $R_2$, which may be the same or different, represent hydrogen or $C_nH_{2n+1}$ where $n$ is 1 to 4 $R_1$ represents hydrogen, $C_nH_{2n+1}$ where $r$ is 1 to 4 or hydroxymethyl, and alkali metal salt derivatives thereof.

2. A derivative as claimed in claim 1, wherein $R_2$ represents hydrogen, R represents hydrogen or $C_nH_{2n+1}$ where $n$ is 1 to 4, and $R_1$ represents $C_nH_{2n+1}$ where $n$ is 1 to 4 or hydroxymethyl.

3. A derivative as claimed in claim 2, wherein X is COOH, R and $R_2$ represent hydrogen and $R_1$ represents hydroxymethyl.

4. A derivative as claimed in claim 2, wherein X is COOH, R and $R_2$ represent hydrogen and $R_1$ represents methyl.

5. A derivative as claimed in claim 2, wherein X is COOH, $R_2$ represents hydrogen, R represents methyl and $R_1$ represents hydroxymethyl.

6. A phloretic acid derivative of the formula

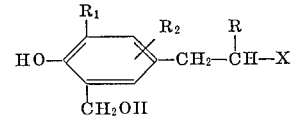

wherein: X is COOH; $R_1$ is hydroxymethyl; R and $R_2$ are H or $C_nH_{2n+1}$, where $n$ is 1 to 6; and the alkali metal salt derivatives thereof.

7. A derivative as claimed in claim 6, wherein $R_2$ represents hydrogen.

8. A derivative as claimed in claim 6, wherein R and $R_2$ represent hydrogen.

9. A derivative as claimed in claim 6, wherein $R_2$ represents methyl.

* * * * *